United States Patent
Singer

(10) Patent No.: US 11,941,697 B2
(45) Date of Patent: *Mar. 26, 2024

(54) DISTRIBUTION OF MARKET DATA BASED ON PRICE LEVEL TRANSITIONS

(71) Applicant: TRADING TECHNOLOGIES INTERNATIONAL INC., Chicago, IL (US)

(72) Inventor: Scott F. Singer, Green Oaks, IL (US)

(73) Assignee: Trading Technologies International, Inc., Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/187,066

(22) Filed: Mar. 21, 2023

(65) Prior Publication Data

US 2023/0237580 A1 Jul. 27, 2023

Related U.S. Application Data

(63) Continuation of application No. 17/465,600, filed on Sep. 2, 2021, now Pat. No. 11,636,543, which is a continuation of application No. 13/709,769, filed on Dec. 10, 2012, now Pat. No. 11,138,525.

(51) Int. Cl.
*G06Q 40/04* (2012.01)
*G06Q 10/04* (2023.01)

(52) U.S. Cl.
CPC .............. *G06Q 40/04* (2013.01); *G06Q 10/04* (2013.01)

(58) Field of Classification Search
None
See application file for complete search history.

(56) References Cited

U.S. PATENT DOCUMENTS

| | | |
|---|---|---|
| 3,253,263 A | 5/1966 | Lee et al. |
| 3,962,685 A | 6/1976 | Belle Isle |
| 4,868,866 A | 6/1989 | Williams, Jr. |
| 4,903,201 A | 2/1990 | Wagner |
| 5,297,032 A | 3/1994 | Trojan et al. |
| 5,339,392 A | 8/1994 | Risberg et al. |
| 5,440,564 A | 8/1995 | Ovadia et al. |

(Continued)

FOREIGN PATENT DOCUMENTS

| | | |
|---|---|---|
| AU | 2007340076 A | 12/2007 |
| CN | 103400296 A | 11/2013 |

(Continued)

OTHER PUBLICATIONS

H. Subramoni, F. Petrini, V. Agarwal and D. Pasetto, "Streaming, low-latency communication in on-line trading systems," 2010 IEEE International Symposium on Parallel & Distributed Processing, Workshops and Phd Forum (IPDPSW), Atlanta, GA, USA, 2010, pp. 1-8. (Year: 2010).*

(Continued)

*Primary Examiner* — Mohammad Z Shaikh
(74) *Attorney, Agent, or Firm* — McDonnell Boehnen Hulbert & Berghoff LLP

(57) ABSTRACT

A system and method for distributing market data in response to price level transitions is disclosed. The system and method provide a mechanism for detecting when a price level transition has occurred. Detection of a price level transition results in the distribution of market data and may include displaying the results.

10 Claims, 12 Drawing Sheets

(56) References Cited

U.S. PATENT DOCUMENTS

| | | | |
|---|---|---|---|
| 5,515,359 A | 5/1996 | Zheng | |
| 5,588,009 A | 12/1996 | Will | |
| 5,680,116 A | 10/1997 | Hashimoto et al. | |
| 5,758,097 A | 5/1998 | Debe et al. | |
| 5,802,310 A | 9/1998 | Rajaraman | |
| 5,809,483 A | 9/1998 | Broka et al. | |
| 5,832,496 A | 11/1998 | Anand et al. | |
| 5,905,868 A | 5/1999 | Baghai et al. | |
| 5,913,202 A | 6/1999 | Motoyama | |
| 5,915,209 A | 6/1999 | Lawrence | |
| 5,982,771 A | 11/1999 | Caldara et al. | |
| 5,995,943 A | 11/1999 | Bull et al. | |
| 5,995,980 A | 11/1999 | Olson et al. | |
| 6,006,206 A | 12/1999 | Smith et al. | |
| 6,026,406 A | 2/2000 | Huang et al. | |
| 6,058,389 A | 5/2000 | Chandra et al. | |
| 6,073,180 A | 6/2000 | Onoda et al. | |
| 6,097,399 A | 8/2000 | Bhatt et al. | |
| 6,278,982 B1 | 8/2001 | Korhammer et al. | |
| 6,366,899 B1 | 4/2002 | Kernz | |
| 6,370,569 B1 | 4/2002 | Austin | |
| 6,408,000 B1 | 6/2002 | Lamberg et al. | |
| 6,501,950 B1 | 12/2002 | Smith et al. | |
| 6,516,339 B1 | 2/2003 | Potts, Jr. et al. | |
| 6,553,035 B1 | 4/2003 | Schwartz et al. | |
| 6,675,153 B1 | 1/2004 | Cook et al. | |
| 6,772,132 B1* | 8/2004 | Kemp, II | G06Q 40/04 715/814 |
| 6,904,596 B1 | 6/2005 | Clark et al. | |
| 6,925,493 B1 | 8/2005 | Barkan et al. | |
| 6,938,011 B1 | 8/2005 | Kemp, II et al. | |
| 6,993,507 B2 | 1/2006 | Meyer et al. | |
| 7,127,424 B2 | 10/2006 | Kemp, II et al. | |
| 7,133,460 B2 | 11/2006 | Bae et al. | |
| 7,167,923 B2 | 1/2007 | Lo | |
| 7,212,997 B1 | 5/2007 | Pine et al. | |
| 7,222,096 B2* | 5/2007 | Anaya | G06Q 40/00 705/37 |
| 7,228,289 B2 | 6/2007 | Brumfield et al. | |
| 7,272,118 B1 | 9/2007 | Yarkosky | |
| 7,310,615 B2 | 12/2007 | Lewis | |
| 7,389,265 B2 | 6/2008 | Lawrence et al. | |
| 7,389,268 B1 | 6/2008 | Kemp, II et al. | |
| 7,412,462 B2 | 8/2008 | Margolus et al. | |
| 7,426,491 B1 | 9/2008 | Singer et al. | |
| 7,462,491 B2 | 12/2008 | Thompson | |
| 7,552,077 B1* | 6/2009 | Schluetter | G06Q 40/06 705/37 |
| 7,555,485 B2 | 6/2009 | Soulanille | |
| 7,567,930 B1* | 7/2009 | Schluetter | G06Q 40/06 705/37 |
| 7,586,484 B2 | 9/2009 | Sampsell et al. | |
| 7,599,867 B1 | 10/2009 | Monroe et al. | |
| 7,606,761 B2 | 10/2009 | Acki et al. | |
| 7,627,682 B2 | 12/2009 | Uthe | |
| 7,685,049 B1* | 3/2010 | Singer | G06Q 40/00 705/37 |
| 7,685,052 B2 | 3/2010 | Waelbroeck et al. | |
| 7,685,616 B2 | 3/2010 | Virdi et al. | |
| 7,742,962 B1 | 6/2010 | Singer | |
| 7,747,510 B1 | 6/2010 | Burns et al. | |
| 7,747,513 B2 | 6/2010 | Duquette et al. | |
| 7,873,065 B1 | 1/2011 | Mukerji et al. | |
| 7,945,508 B2* | 5/2011 | Duquette | G06Q 30/08 705/37 |
| 7,970,697 B2* | 6/2011 | Schwarz | G06Q 40/04 705/37 |
| 8,036,977 B1 | 10/2011 | Mintz et al. | |
| 8,041,624 B2 | 10/2011 | Buckwalter et al. | |
| 8,082,573 B2 | 12/2011 | Miyamoto et al. | |
| 8,090,637 B2* | 1/2012 | Schluetter | H04L 41/0896 705/37 |
| 8,229,823 B2* | 7/2012 | Schluetter | G06Q 40/03 705/37 |
| 8,290,850 B1* | 10/2012 | Singer | G06Q 30/02 705/37 |
| 8,301,546 B2* | 10/2012 | Schwarz | G06Q 40/00 705/37 |
| 8,352,344 B2 | 1/2013 | Schluetter et al. | |
| 8,407,135 B2 | 3/2013 | Singer | |
| 8,423,373 B2* | 4/2013 | Singer | G06Q 40/04 705/40 |
| 8,571,959 B2 | 10/2013 | Schluetter et al. | |
| 8,589,948 B2* | 11/2013 | Kemp, II | G06F 9/546 705/16 |
| 8,606,690 B2 | 12/2013 | Singer | |
| 8,762,257 B2* | 6/2014 | Singer | G06Q 20/042 705/40 |
| 8,799,135 B2* | 8/2014 | Duquette | G06Q 40/04 705/37 |
| 9,197,428 B1* | 11/2015 | Lebedev | H04L 12/1822 |
| 10,026,122 B2* | 7/2018 | West | G06Q 40/04 |
| 10,037,570 B2* | 7/2018 | Duquette | G06Q 30/08 |
| 10,055,790 B2 | 8/2018 | Singer | |
| 10,248,999 B2 | 4/2019 | Singer | |
| 10,453,134 B2 | 10/2019 | Zhou | |
| 10,467,691 B2* | 11/2019 | Singer | G06Q 40/04 |
| 10,572,941 B2* | 2/2020 | West | G06Q 40/04 |
| 10,726,486 B2 | 7/2020 | Singer | |
| 10,776,871 B2 | 9/2020 | Singer | |
| 10,937,095 B2 | 3/2021 | West | |
| 11,282,141 B2 | 3/2022 | Singer | |
| 2002/0026528 A1 | 2/2002 | Lo | |
| 2002/0097697 A1 | 7/2002 | Bae et al. | |
| 2002/0120546 A1 | 8/2002 | Zajac | |
| 2002/0161883 A1 | 10/2002 | Matheny et al. | |
| 2002/0184237 A1 | 12/2002 | McFeely | |
| 2003/0009550 A1 | 1/2003 | Taylor et al. | |
| 2003/0009553 A1 | 1/2003 | Benfield et al. | |
| 2003/0055768 A1 | 3/2003 | Anaya et al. | |
| 2003/0061069 A1 | 3/2003 | Silverman et al. | |
| 2003/0065598 A1 | 4/2003 | Bunda | |
| 2003/0126068 A1 | 7/2003 | Hauk et al. | |
| 2004/0019554 A1* | 1/2004 | Merold | G06Q 40/04 705/37 |
| 2004/0039733 A1 | 2/2004 | Soulanille | |
| 2004/0153533 A1 | 8/2004 | Lewis | |
| 2004/0162772 A1 | 8/2004 | Lewis | |
| 2004/0244045 A1 | 12/2004 | Miyamoto et al. | |
| 2004/0254877 A1 | 12/2004 | Buckwalter et al. | |
| 2005/0027629 A1 | 2/2005 | De Breed et al. | |
| 2005/0044037 A1 | 2/2005 | Lawrence et al. | |
| 2005/0177657 A1 | 8/2005 | Pope et al. | |
| 2005/0198437 A1 | 9/2005 | Mukherjee | |
| 2005/0203825 A1 | 9/2005 | Angle et al. | |
| 2006/0039293 A1 | 2/2006 | Uthe | |
| 2006/0047849 A1 | 3/2006 | Mukherjee | |
| 2006/0066503 A1 | 3/2006 | Sampsell et al. | |
| 2006/0069635 A1 | 3/2006 | Ram et al. | |
| 2006/0200404 A1 | 9/2006 | Stearns | |
| 2006/0265309 A1 | 11/2006 | Sweeting et al. | |
| 2006/0287934 A1 | 12/2006 | Rowe | |
| 2007/0005481 A1 | 1/2007 | Kedia et al. | |
| 2007/0078700 A1 | 4/2007 | Lenzmann et al. | |
| 2007/0100733 A1 | 5/2007 | Huizing et al. | |
| 2007/0208647 A1 | 9/2007 | Gemuenden et al. | |
| 2008/0097887 A1* | 4/2008 | Duquette | G06Q 30/06 705/37 |
| 2008/0097893 A1 | 4/2008 | Walsky et al. | |
| 2008/0162324 A1* | 7/2008 | West | G06Q 40/04 705/37 |
| 2008/0232364 A1 | 9/2008 | Beverly | |
| 2009/0240633 A1 | 9/2009 | Schluetter et al. | |
| 2010/0005022 A1 | 1/2010 | DePetris et al. | |
| 2010/0100830 A1 | 4/2010 | Singer | |
| 2010/0131398 A1 | 5/2010 | Molloy et al. | |
| 2010/0138335 A1 | 6/2010 | Kemp, II et al. | |
| 2010/0228833 A1 | 9/2010 | Diqiette et al. | |
| 2011/0184849 A1 | 7/2011 | Duquette et al. | |
| 2011/0218904 A1 | 9/2011 | Schwarz et al. | |
| 2012/0072325 A1 | 3/2012 | Schluetter et al. | |

(56) References Cited

U.S. PATENT DOCUMENTS

| | | | |
|---|---|---|---|
| 2012/0259767 A1* | 10/2012 | Schluetter | H04L 41/0896 705/37 |
| 2012/0317011 A1 | 12/2012 | Duquette | |
| 2013/0006841 A1 | 1/2013 | Singer | |
| 2013/0085923 A1* | 4/2013 | Schluetter | H04L 41/0896 705/37 |
| 2013/0151395 A1 | 6/2013 | Singer | |
| 2013/0211997 A1* | 8/2013 | Singer | G06Q 40/04 705/37 |
| 2013/0212001 A1* | 8/2013 | Duquette | G06Q 40/04 705/37 |
| 2014/0143119 A1 | 5/2014 | Singer | |
| 2014/0164202 A1* | 6/2014 | Singer | G06Q 40/04 705/37 |
| 2014/0236795 A1 | 8/2014 | Schluetter et al. | |
| 2014/0316966 A1 | 10/2014 | Singer | |
| 2018/0293652 A1 | 10/2018 | West | |
| 2018/0330441 A1 | 11/2018 | Singer | |
| 2019/0172135 A1 | 6/2019 | Singer | |
| 2020/0143472 A1 | 5/2020 | West | |
| 2020/0311813 A1 | 10/2020 | Singer | |
| 2020/0364793 A1 | 11/2020 | Singer | |
| 2021/0103986 A1 | 4/2021 | West | |

FOREIGN PATENT DOCUMENTS

| | | |
|---|---|---|
| EP | 1422641 A1 | 5/2004 |
| JP | H06-004544 A | 1/1994 |
| JP | H06-250947 A | 9/1994 |
| JP | 2010-527477 A | 8/2010 |
| WO | 1999/13426 A1 | 3/1999 |
| WO | 2002/09454 A2 | 1/2002 |
| WO | 2002/017193 A1 | 2/2002 |
| WO | 2006/012284 A2 | 2/2006 |
| WO | 2008/140950 A2 | 11/2008 |
| WO | 2012/145532 A2 | 10/2012 |

OTHER PUBLICATIONS

Berrada, T., "Incomplete Information, Heterogeneity, and Asset Pricing" [online], Journal of Financial Econometrics, Oxford: Winter 2006, vol. 4, Iss. 1, p. 136 (Abstract Only). [Retrieved on Jun. 21, 2012] from the Internet: http://proquest.umi.com/, ProQuest Document ID: 958859761.

Bigrigg, "Survivable Information Storage Systems," Computer (Aug. 2000).

Buckley, Chris, "Implementation of the SMART Information Retrieval System," Department of Computer Science, Cornell University, Ithaca, New York, (May 1985).

Canadian Application No. 2,671,394, Office Action dated Nov. 29, 2011 (4 pages).

Canter, M.S., Ph.D., "Price Discovery in Futures Markets" [online], Ph.D. Dissertation, Columbia University, New York: 1996, 134 Pages (Abstract only), AAT 9631673. [Retrieved on Jun. 21, 2012] from the Internet: http://proquest.umi.com/, ProQuest Document ID: 743048241.

Chen, Ling and Chen, Gen-Cai. "Fuzzy DR Algorithm for Data Distribution Management," Journal of Zhejiang University, Sep. 2006, pp. 1521-1525 (Abstract only).

Chakravarty, et al., "Decimal Trading and Market Impact." Mar. 26, 2001.

Clemons & Weber, "Restructuring Institutional Block Trading: An Overview of the Opti-Mark System." Journal of Management Information Systems. vol. 15, Issue 2, pp. 41-60 (Fall 1998).

European Application No. 07855266.8, Extended Search Report dated Dec. 2, 2010 (7 pages).

European Application No. 07855266.8, Office Action dated Nov. 17, 2011 (4 pages).

European Application No. 07855266.8, Official Communication dated Apr. 20, 2012 (3 pages).

Fahringer, T., Buffer-Safe Communication Optimization based on Data Flow Analysis and Performance Prediction. Institute for Software Technology and Parallel Systems, University of Vienna Liechtensteinstr. 22, A-1090, Vienna, Austria {tf,mehofer} @par.univie.ac.at. (Year: 1997).

Garcia, Albert B. "Estimating Computer Communication Network Performance Using Network Simulations," The University of Dayton, UMI Dissertation Publishing, 1985 (Abstract).

Hunter, J., "LAN Bridges Bridging the Gap" [online], Network World, vol. 6, No. 27, Jul. 10, 1989, ProQuest Central, p. 39.

IBM, GEAC System 21, Concept and tasks associated with AS/400 system, http://www.redbooks.ibm.com/redbooks/pdfs/sg245967.pdf, pp. 3-15, Section 1.1; 2001.

International Search Report and Written Opinion of International Application No. PCT/US2007/088143 dated Mar. 1, 2008 (dated Apr. 28, 2008) (10 pages).

Johnson, T.D., Ph.D., "Connection Level Priority/Pre-Emption Service for Asynchronous Transfer Mode Communication Networks" [online], Ph.D. Dissertation, ProQuest Dissertations and Theses (PQDT), 1997, 422 pages.

Lakshmanan, G.T., et al., "Placement Strategies for Internet-Scale Data Stream Systems," in IEEE Internet Computing, vol. 12, No. 6, pp. 50-60, Nov.-Dec. 2008. (Year: 2008).

Lizy, J., Code Coalescing Unit: A Mechanism to Facilitate Load Store Data Communication. Electrical and Computer Engineering Department, the University of Texas at Austin Austin, TX 78712, ljohn@ece.utexas.edu., (Year: 1998).

Marshall, D. "Thread programming examples", https://users.cs.cf.ac.uk/Dave.Marshall/C/node32.html; Jan. 5, 1999.

Microsoft Computer Dictionary, Microsoft Press, 5th Ed., 2002, p. 518.

Paul, et al. "Course 24: OpenGL and Window System Integration" Presented at Special Interest Group on Graphics and Interactive Techniques (SIGGRAPH), Los Angeles, Aug. 3-8, 1997. http://www.siggraph.org/s97/conference/courses/24.html.

Preliminary Examination Instructions in view of the Supreme Court Decision in Alice Corporation Pty. Ltd. v. CLS Bank International, et al. (signed Jun. 25, 2014).

Raghavan, Gopalakrishna. "Industrial Strength Formalization of Object-Oriented Real Time Systems," Florida Atlantic University, UMI Dissertation Publishing, 2000.

Sable, et al., "Evolution to the Advanced Intelligent Network," Evolution to the Advanced Intelligent Networks, AT & T, Apr. 5, 1992, pp. 103-113 (Document No. XP000684008).

Sarin et al., "Using History Information to Process Delayed Database Updates," Proceedings of the Twelfth International Conference on Very Large Databases, Kyoto—Japan (Aug. 1986).

Scarborough, B., "Distributed Database Gives More Data Independence and Sharing" [online], Computing Canada, Willowdale: May 30, 1985, vol. 11, Iss. 11, Pg. Software (Abstract only). [Retrieved on Jun. 21, 2012] from the Internet: http://proquest.umi.com/, ProQuest Document ID: 7066702.

Shaikh, A., Traffic Characteristics of Bulk Data Transfer using TCP/IP over Gigabit Ethernet. Department of Computer Science and Engineering University of South Florida Tampa, FL 33620 {ashaikh, christen} @csee.usf.edu. (Year: 2001).

Singapore Application No. 11201504196Q, Written Opinion issued by Austrian Patent Office dated Mar. 3, 2016 (dated Apr. 1, 2016).

Singapore Application No. 2009-04177-3, Written Opinion issued by Austrian Patent Office (dated Nov. 16, 2009) (4 pages).

Singapore Application No. 2009-04177-3, Examination Report issued by Austrian Patent Office (dated Oct. 13, 2010) (4 pages).

Taylor, P., "Second Quarter Sales Surge but Competition Depresses Margins" [online], Financial Times, London, United Kingdom, Jul. 28, 1998, p. 4. [Retrieved on Aug. 28, 2008] from the Internet: http://proquest.umi.com/, ProQuest Document ID: 32380156.

Ye, J., Ph. D., "An Investigation of Market Fragmentation and the Specialist's Quotation Strategy," [online], Ph.D. Dissertation, ProQuest Dissertations and Theses (PQDT), 1995, 110 pages.

* cited by examiner

300

| | 106 | |
|---|---|---|
| | 105 | |
| | 104 | |
| | 103 | x |
| | 102 | x |
| x | 101 | |
| x | 100 | |
| x | 99 | |
| x | 98 | |
| | 97 | |

| | 106 | |
|---|---|---|
| | 105 | |
| | 104 | |
| | 103 | x |
| | 102 | x |
| x | 101 | |
| x | 100 | |
| | 99 | |
| x | 98 | |
| | 97 | |

DISTRIBUTION OF MARKET DATA BASED ON PRICE LEVEL TRANSITIONS

CROSS REFERENCE TO RELATED APPLICATIONS

This application is a continuation of U.S. patent application Ser. No. 17/465,600 filed Sep. 2, 2021, now U.S. Pat. No. 11,636,543, which is a continuation of U.S. patent application Ser. No. 13/709,769 filed Dec. 10, 2012, now U.S. Pat. No. 11,138,525, the contents of which are fully incorporated herein by reference for all purposes.

BACKGROUND

An electronic trading system generally includes a trading device in communication with an electronic exchange. The electronic exchange sends information about a market for a tradeable object (market information), such as prices and quantities, to the trading device. The trading device sends messages, such as messages related to orders, to the electronic exchange. The electronic exchange attempts to match quantity of an order with quantity of one or more contra-side orders.

Electronic exchanges have continued increasing the amount of market information provided to the trading device. This increase provides various benefits and problems. For example, increasing the amount of market information may increase transparency about the market. In another example, some trading devices—such as mobile devices—are connected to the exchange via a connection that has bandwidth, download, or data limitations. Increasing the amount of market information may cause trading devices to reach their bandwidth, download, or data allowance/limitations sooner. In another example, trading devices have limited processing capacity. Increasing the amount of market information transmitted to the trading device may result in processing problems for the trading device. In yet another example, traders may not be able to comprehend (mentally process) all the information displayed on the trading device. As a result, increasing the amount of market information may be distracting to the trader and cause them to lose focus.

There is a need to effectively control the amount of market information transmitted through an electronic trading system.

BRIEF DESCRIPTION OF THE FIGURES

Certain embodiments are disclosed with reference to the following drawings.

FIGS. 3A and 3B illustrate an exemplary change in quantity at certain price levels, which is not a price level transition.

Figure 1:
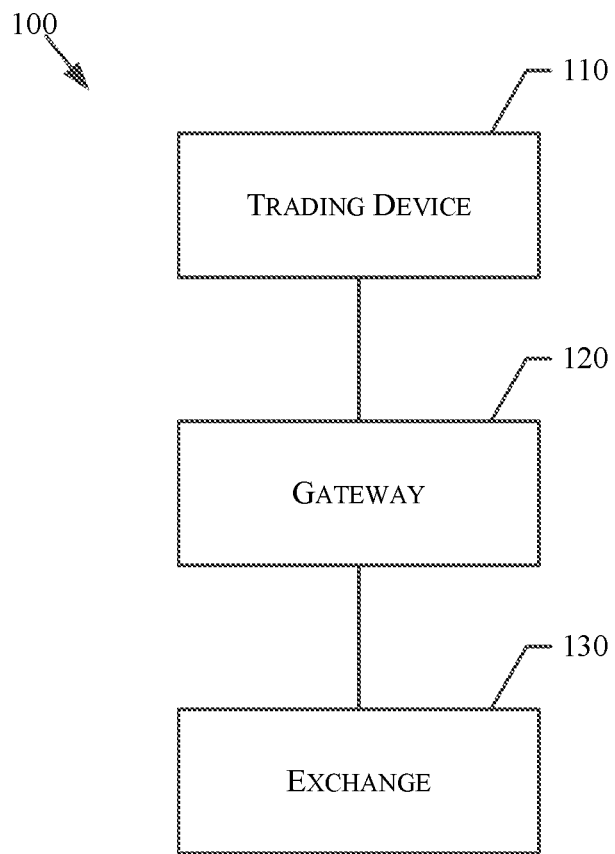
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DESCRIPTION

I. Brief Description

The present embodiments relate to distribution of market data based on price level transitions. Market data may be distributed when one or more price level transitions are identified.

A price level transition includes a change at one or more price levels that trigger distribution of market data. For example, a price level transition may be a change from "quantity available" to "no quantity available" at one or more price levels. By way of illustration, this price level transition may include a change from no available bids or offers at a price level to some available bids or offers at that price level. The reverse (e.g., "no quantity available" to "quantity available") is also a price level transition. For example, a change from "no quantity available" to "quantity available" at a particular price level is also an exemplary price level transition. Another exemplary price level transition is a change in the last traded price. Yet another exemplary price level transition is a change in the overall quantity available above or below an overall quantity threshold. Another exemplary price level transition may be a new high or low price level for a trading session. Other price level transitions may be used as triggers for distribution of market data.

In some embodiments, market data is only distributed when one or more price level transitions are identified. For example, while a gateway may continuously/periodically receive market data from an exchange, the gateway may send the market data to the trading device only when a price level transition is identified. This may reduce the amount of information distributed to the trading device but allow the market data to be distributed when certain shifts in the market occur.

In some embodiments, in addition to distributing market data when a price level transition is identified, market data may be periodically distributed at the end of a defined time period regardless of whether or not a price level transition is identified. For example, market data may be coalesced, for example, at a gateway and delivered periodically to a trading device. Coalescing relates to combining market data to provide the most up-to-date data over a given time period. In some embodiments, market data may be distributed prior to the expiration of the time period when a price level transition is identified. Instead of waiting until the end of the time period, the coalesced market data may be transmitted anytime a price level transition is identified. This may be particularly beneficial when the coalescing periods are longer. As another example, market data is distributed to a trading device at the end of a coalescing period only when a price level transition occurs during a coalescing period. This may reduce the need to send market data even at the end of the coalescing period.

In some embodiments, a system includes an electronic exchange adapted to receive order messages for a tradeable object and transmit a price feed including market data related to one or more unmatched orders for the tradeable object. The system may also include a gateway adapted to receive the price feed, coalesce market data, and distribute the market data. The system may also include a trading device that is adapted to receive the market data from the gateway and display the market data on a display device. A price level transition is a change at a price level that triggers distribution of market data. The gateway is configured to identify one or more price level transitions and transmits the market data in response to identifying the one or more price level transitions.

In some embodiments, a method for distributing market data includes receiving, using a computing device, market data, including information about prices and quantities, for a tradeable object. The method may further include identifying, using the computing device, one or more price level transitions, where a price level transition is a change at a price level that triggers distribution of market data. The method may further include distributing, using the computing device, market data in response to identifying the one or more price level transitions.

In some embodiments, a tangible computer readable storage medium includes a set of instructions for execution by a processor. The set of instructions, when executed by a processor, implement a method including receiving, using a computing device, market data including information about prices and quantities for a tradeable object. The set of instructions may implement identifying, using the computing device, one or more price level transitions, where a price level transition is a change at a price level that triggers distribution of market data. The set of instructions may implement distributing, using the computing device, market data in response to identifying the one or more price level transitions.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

II. Detailed Description

FIG. 1 illustrates a block diagram representative of an example electronic trading system 100 in which certain embodiments may be employed. The electronic trading system 100 includes a trading device 110, a gateway 120, and an exchange 130. The trading device 110 is in communication with the gateway 120. The gateway 120 is in communication with the exchange 130. As used herein, the phrase "in communication" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange (for example, the exchange 130), a product defined by the user, a combination of real or synthetic products, or a combination thereof. There may be a synthetic tradeable object that corresponds and/or is similar to a real tradeable object.

Market data may include data about a market for a tradeable object. For example, market data may include the inside market, market depth, last traded price ("LTP"), a last traded quantity ("LTQ"), or a combination thereof. The inside market is the lowest available ask price (best offer) and the highest available bid price (best bid) in the market for a particular tradable object at a particular point in time (since the inside market may vary over time). Market depth refers to quantities available at the inside market and at other prices away from the inside market. Due to the quantity available, there may be "gaps" in market depth.

A data feed is a series of one or more messages that includes market data. Different types of data feeds, such as a price data feeds, order data feeds, fill data feeds, or any other now known or later developed data feeds may be generated and/or distributed. A price data feed may include at least the inside market, market depth, last traded price, and last traded quantity. The data in a price data feed is not specific to a particular market participant. As such, the price data feed may be provided to a plurality of market participants, whether or not these market participants are related. A price data feed may be modified in accordance with an embodiment.

One or more components in the electronic trading system 100 may be configured to distribute market data based on one or more price level transitions. For example, the exchange 130 may generate and/or distribute a price data feed when a price level transition is detected. In another example, a gateway 120 may coalesce a price data feed until a price level transition is recognized. In yet another example, a trading device 110 may update the display of market data in response to detecting a price level transition.

Figure 2:
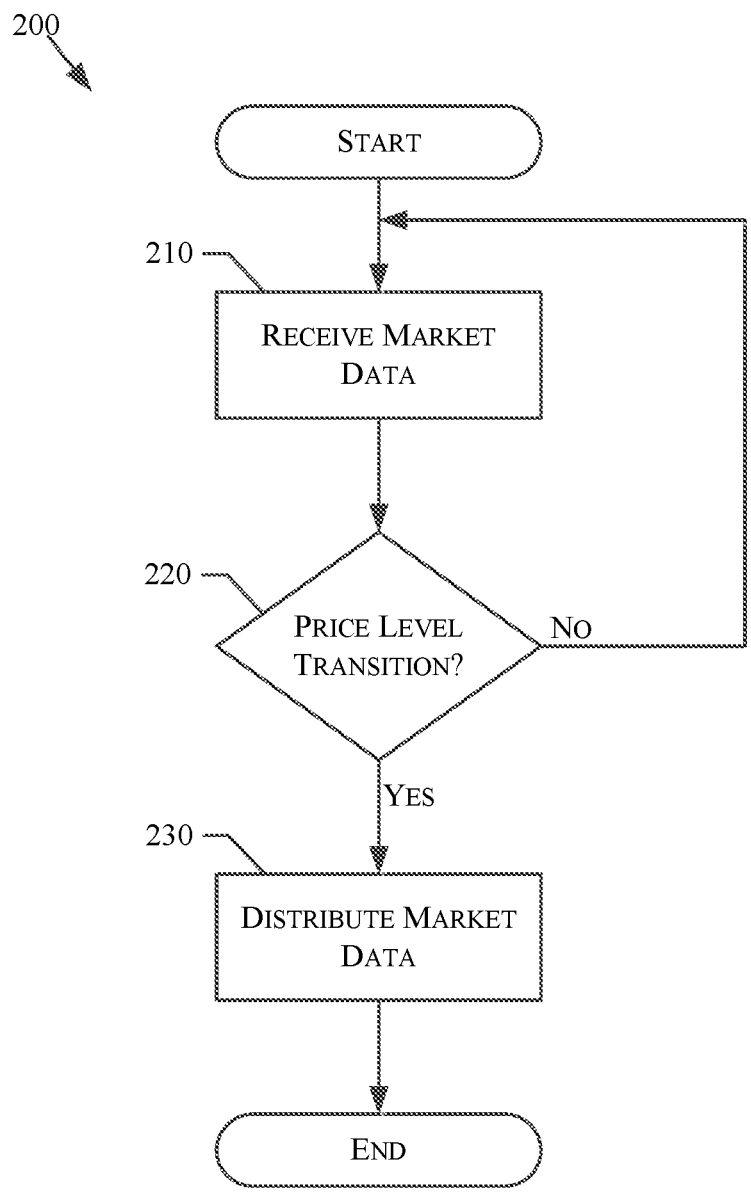
FIG. 2 illustrates a block diagram of a method for distributing market data based on a price level transition.

FIG. 2 illustrates a method 200 for distributing market data based on one or more price level transitions. The method 200 may be implemented by or using any of an apparatus (e.g., the trading device 110, gateway 120, or electronic exchange 130 of FIG. 1), a system, a computer program, a computer readable medium, or a combination thereof.

With respect to method 200, changes and modifications, such as additional, different, or fewer acts, may be made to the process shown in FIG. 2 without departing from the spirit and scope of certain inventive aspects described herein. For example, the method 200 may include only acts 220-230 or a different combination of acts. Furthermore, the acts shown in FIG. 2 may be performed in the order shown or a different order.

In act 210, a computing device, such as the trading device 110, gateway 120, or exchange 130 of FIG. 1, receives market data. Receiving market data may include collecting, generating, aggregating, acquiring, or otherwise obtaining market data. For example, a trading device may receive a coalesced or uncoalesced price data feed from a gateway. In another example, an exchange may receive order messages relating to a tradeable object from one or more trading devices. The exchange may collect data about the tradeable object. For instance, the exchange may store information, such as orders for the tradeable object, in an exchange order book. The exchange may then generate a price data feed based on information stored in the exchange order book.

In act 220, the computing device determines whether a price level transition occurred. Determining the occurrence of a price level transition may include analyzing market data to identify one or more price level transitions. In some embodiments, determining the occurrence of a price level transition may include using one or more price level transition rules to analyze the market data and detect the existence of one or more market conditions. An example of a price level transition rule may be "a price level transition occurs when all the quantity at a particular price level disappears." Another example of a price level transition rule may be "a price level transition occurs when the last traded price changes." One or more price level transition rules may be defined for the examples shown in FIGS. 3A and 3B, 4A and 4B, 5A and 5B, and 6A to 6C, which are discussed below. A computing device may use (e.g., compare) one or more price level transition rules and market data to determine when a price level transition occurs. Price level transition rules may be set as defaults (e.g., at time of manufacture, by a user before or during a trading session) or may be dynamically changed (e.g., automatically or manually).

Figures 3A, 3B:
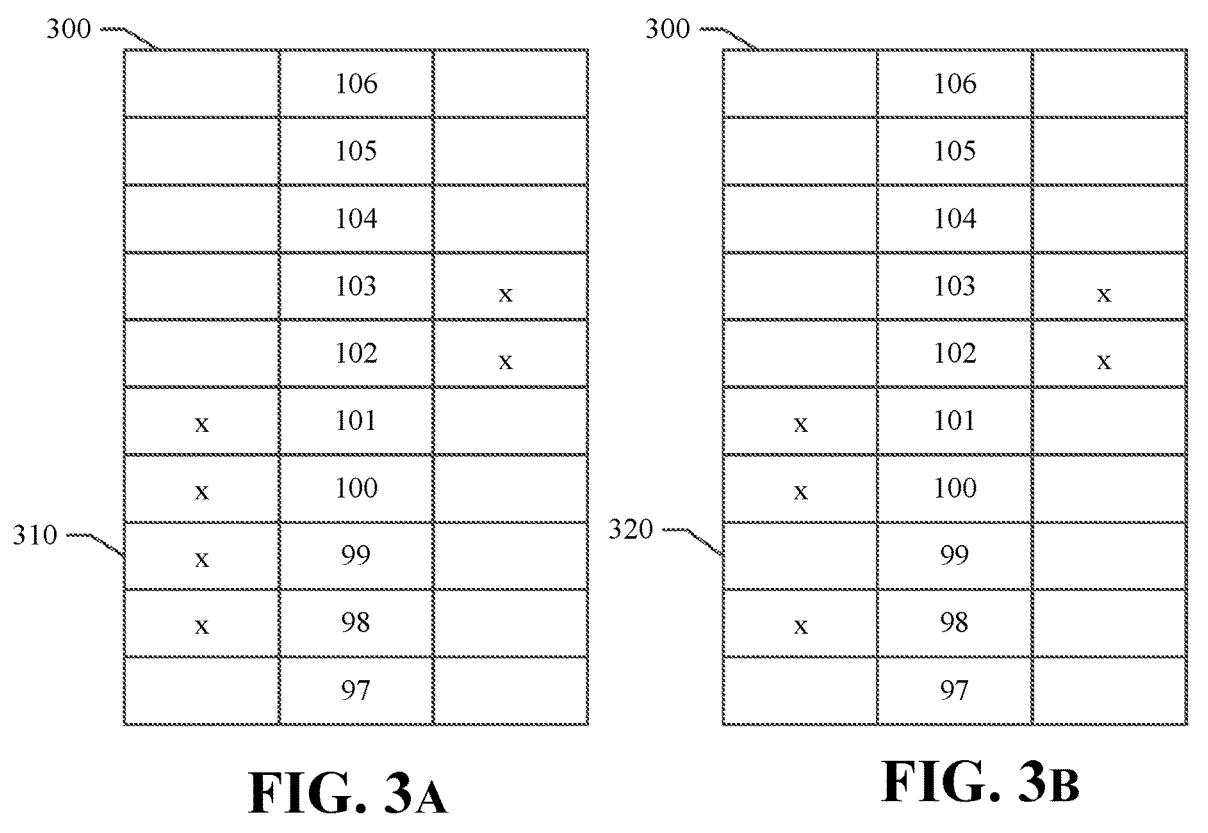
Figure 4A:
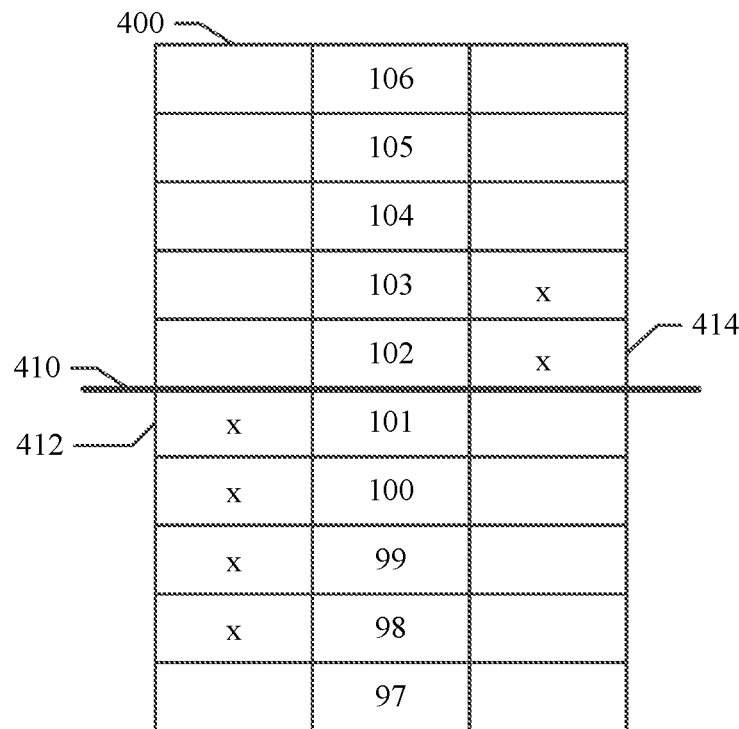
FIGS. 4A and 4B illustrate an exemplary change of the inside market, which is a price level transition.
Figure 4B:
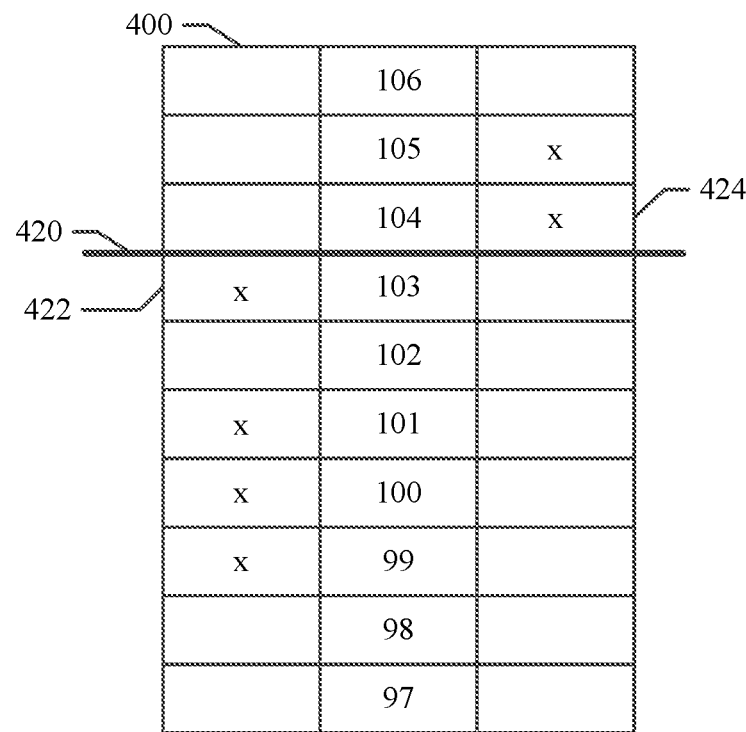
Figure 5A:
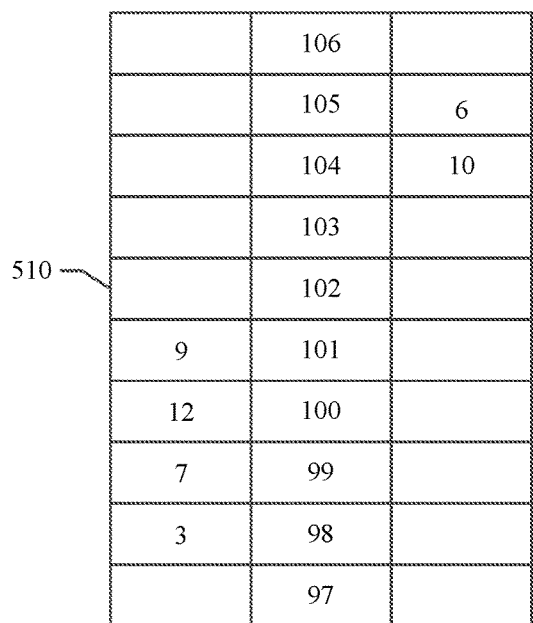
FIGS. 5A and 5B illustrate an exemplary change in the last traded price, which is a price level transition.
Figure 5B:
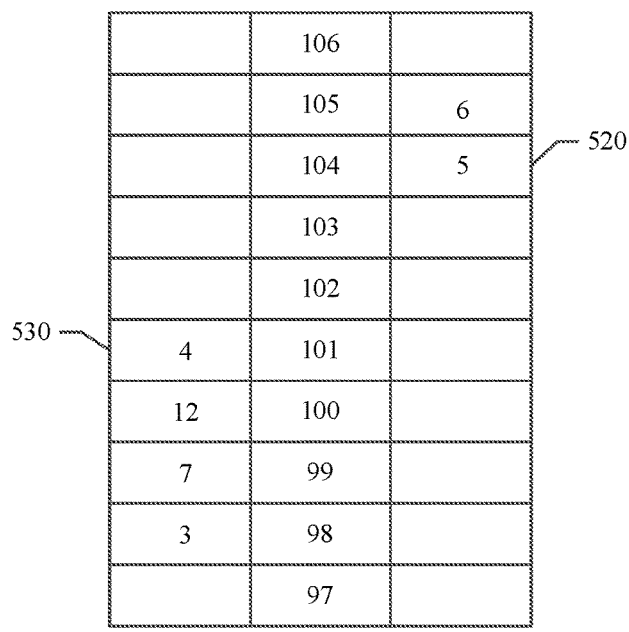
Figure 6A:
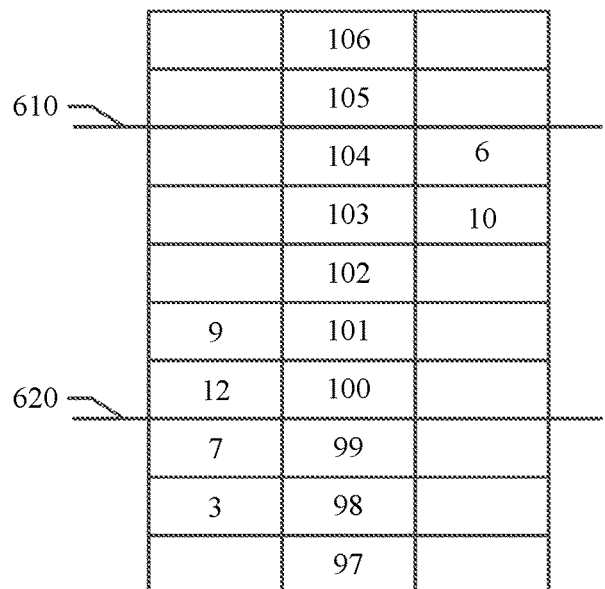
FIGS. 6A to 6C illustrate an example of a price level transition.
Figure 6B:
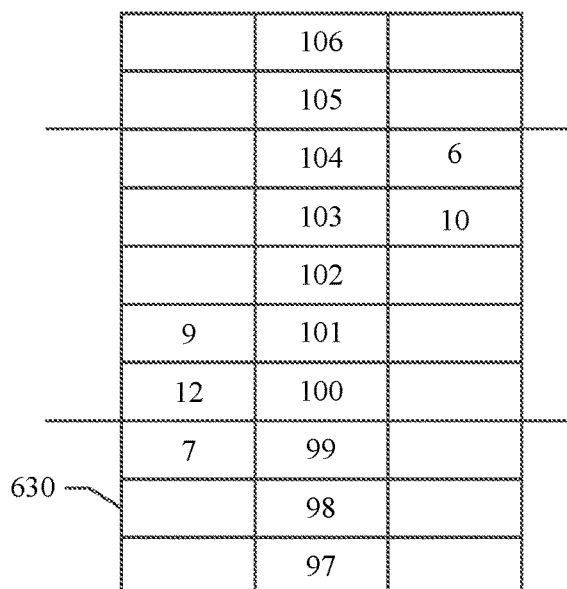
Figure 6C:
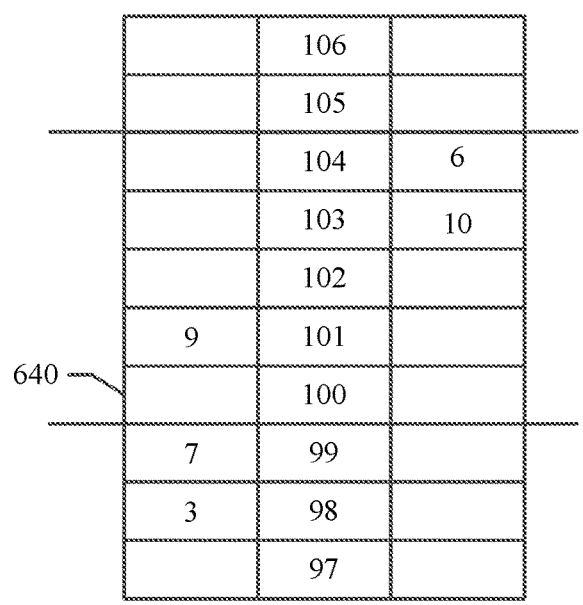
Figure 11A:
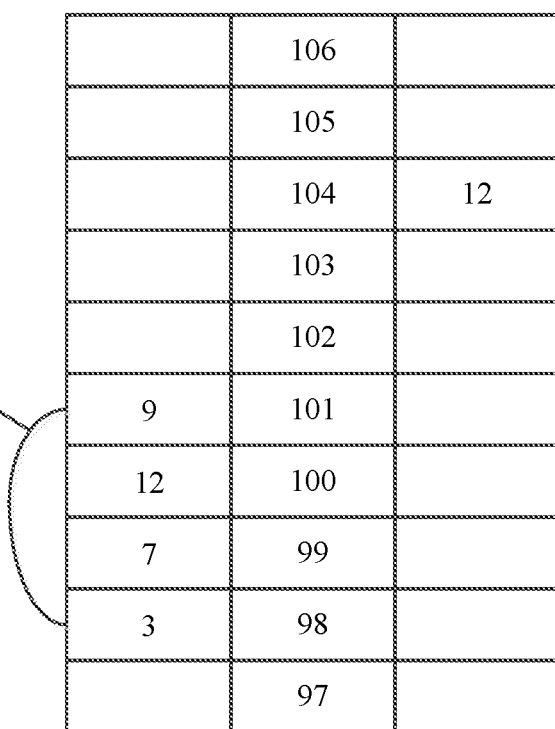
FIGS. 11A and 11B illustrate another example of a price level transition.
Figure 11B:
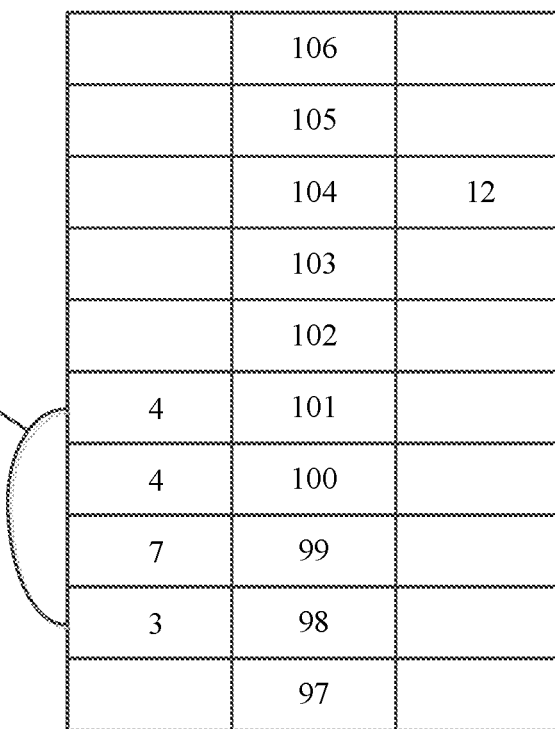
Figure 12A:
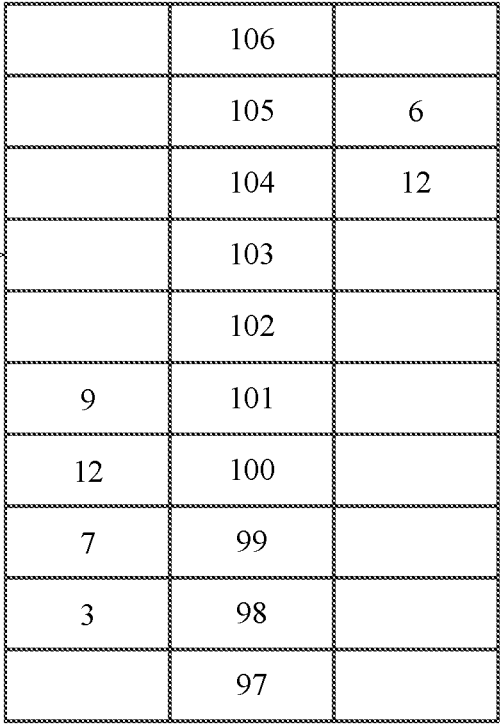
FIGS. 12A and 12B illustrate yet another example of a price level transition.
Figure 12B:
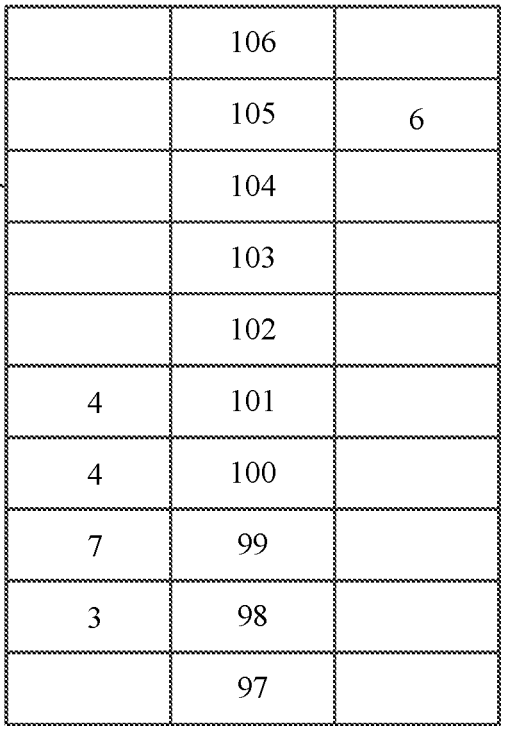

As discussed in more detail below, FIGS. 3A and 3B, 4A and 4B, 5A and 5B, 6A to 6C, 11A and 11B, and 12A and 12B illustrate exemplary price level transitions. FIGS. 3A and 3B illustrate an example where a price level transition includes a change from quantity available to no quantity available at a certain price level. FIGS. 4A and 4B illustrate an example where a price level transition includes a change in the inside market. FIGS. 5A and 5B illustrate an example where a price level transition includes a change in the last traded price. FIGS. 6A to 6C illustrate an example where a price level transition includes a change at multiple price levels. FIGS. 11A and 11B illustrate an example where a price level transition includes a change in the overall quantity available relative to a contra-side order. FIGS. 12A and 12B illustrate an example where a price level transition includes a new high or low price level for a trading session.

Returning to FIGS. 3A and 3B, these example figures illustrate a user interface that includes a value axis 300. The value axis 300 includes a series of value levels that are axis oriented. The series of value levels represent values (such as prices or derivatives of prices) of the tradeable object and are oftentimes displayed in numerical order. The value levels, or price levels as shown in FIGS. 3A and 3B, may increment in the minimum amount that the price of the market can change (e.g., tick size), or some other set amount. The number of value levels may be fixed or adjustable. An example value axis may have 20 value levels, though more or less value levels can be used. Market data, such as a bid, offer, last traded quantity, working order, or any other item of interest associated with the market, can be displayed in alignment with the value axis. A value axis may sometimes be ladder trading tool that facilitates electronic trading. For example, orders for the tradeable object may be initiated (and sent in one embodiment) directly off the value axis 300. In some embodiments, a value axis is included in MD Trader® provided by Trading Technologies International, Inc. of Chicago, Illinois ("Trading Technologies"). The value axis may include additional trading tools.

In FIGS. 3A and 3B, an "x" indicates a quantity available at that price level. As shown at price level 310, the quantity, represented by "x", is available at the price level of 99. For example, the quantity may be 1 or it may be 85 where there is an "x." The "x" is representing that the quantity is greater than 0. As shown at 310, one or more bids have been placed with an exchange at the price level of 99. In some embodiments, the actual quantity available is known and/or displayed. However, in other embodiments, the actual quantity is not known and/or not displayed. As shown at price level 320, the quantity previously available at the price level of 99 is no longer available. By way of example, an order to buy the tradeable object at the price level of 99 may have been cancelled. That order may have been the only order at that price level. As a result, when it was cancelled, there is no longer any quantity available. The change (e.g., switch from one state to another state) from "quantity available" (FIG. 3A) to "no quantity available" (FIG. 3B) is an example of a price level transition.

FIGS. 4A and 4B illustrate a value axis 400, which is the same or similar to value axis 300 of FIGS. 3A and 3B. FIGS. 4A and 4B illustrate a change in the inside market. As shown in FIG. 4A, the inside market 410 is 101/102 because the best bid price 412 is at a price level of 101 and the best ask price 414 is at a price level of 102. The inside market is the lowest available ask price (best ask) and the highest available bid price (best bid) in the market for a particular tradeable object at a particular point in time.

FIG. 4B illustrates a change in the inside market 410 of FIG. 4A. As shown in FIG. 4B, the inside market 420 has now changed to 103/104 because the best bid price 422 is now at a price level of 103 and the best ask price 424 is now at a price level of 104. The change in the inside market (e.g., from 101/102 to 103/104) is an exemplary price level transition.

The illustrated change in the inside market, as shown in FIGS. 4A and 4B, includes two changes from "quantity available" to "no quantity available" (e.g., at price levels 103/104 and price level 98). However, it is possible that the inside market may change with a single switch from "quantity available" to "no quantity available" or vice-versa. For example, the inside market may be 101/104. An order to buy the tradeable object at a price level at 103 would change the inside market to 103/104 because the best bid is now at 103. No quantity was previously available at the price level of 103 and now there is quantity available. This change is would also be a change in the inside market.

A trading strategy may not be based on a change in quantity (e.g., from 8 bids to 12 bids) at price levels. However, trading strategies do depend on changes from "quantity available" to "no quantity available." These changes generally represent changes that require action. For example, assume that a spread price is wide (e.g., the prices between two tradeable objects is relatively far apart). As the spread price narrows, the quantities at various price levels will begin to change from "no quantity available" to "quantity available" or vice-versa. Trading strategies may account for the narrowing of spread price. In another example, a trading strategy may lean on the inside market of a particular tradeable object. For purposes of the trading strategy, quantity available at the inside market is sufficient to assume that there is enough to lean on this tradeable object. Accordingly, in both examples, it doesn't matter, for purposes of the trading strategy, how much quantity is available. It only matters, for these examples, that there is some quantity available.

FIGS. 5A and 5B illustrate a change in the last traded price (LTP). The change in last traded price is an exemplary price level transition. The last traded price is the price at which a tradeable object was last traded. In the example of FIG. 5A, the last traded price 510 is at a price level of 102. This means that an order to buy the tradeable object at a price level of 102 was matched with an order to sell the tradeable object at a price level of 102. As a result, the last traded price 510 is at a price level of 102.

The last traded price may change. This change may be a price level transition. For example, as shown in the example of FIG. 5B, an order to sell 5 units of the tradeable object at a price level 520 of 104 may be modified to sell the 5 units at the best bid price (e.g., at a price level 530 in FIG. 5B). Once modified, the order to sell 5 units at a price level 530 of 101 is matched with one or more orders to buy the tradeable object at a price level 530 of 101. Once the orders are matched, the last traded price is now at a price level 530 of 101; as opposed to a price level 510 of 102. The change in last traded price is an exemplary price level transition.

Once the modify order is entered, the quantity available at price level 520 changes from 10 (in FIG. 5A) to 5 (in FIG. 5B). The change in quantity available is not necessarily a price level transition because there is still quantity available at price level 520. Once the orders (to buy and sell) are matched, the quantity available at price level 530 drops from 9 (in FIG. 5A) to 4 (in FIG. 5B). This change in quantity available is also not necessarily a price level transition because there is still quantity available at price level 530.

Some price levels may be more important than other price levels. As a result, certain price level transitions may be more important. In some embodiments, price level transitions at certain price levels may not trigger distribution of market data. These price level transitions may be disregarded for purposes of distributing market data. In some embodiments, the price level transitions at certain price levels may not even be considered price level transitions for purposes of distributing market data.

FIGS. 6A to 6C illustrate an example embodiment where price level transitions at certain price levels may trigger distribution of market data and price level transitions at other price levels are disregarded for purposes of distributing market data. In FIG. 6A, the inside market is 101/103. In this example, price level transitions within two levels of the inside market (including the inside market) are considered price level transitions for purposes of distribution of market data. The lines 610, 620 shown in FIG. 6A illustrate the price levels that will trigger distribution of market data (e.g., price levels 100-104). The lines 610, 620 also illustrate the price levels (e.g., more than two levels away from the inside market) where price level transitions will not trigger distribution of market data.

The distance from the inside market may be an absolute or relative distance. An example of an absolute distance may include a certain (e.g., defined) number of ticks from the inside market. That example is shown in FIG. 6A. An example of a relative distance may be a certain number of price levels having quantity away from the inside market. For example, assume in FIG. 6A that there is no quantity at the price level of 100. In this example, the line 620 would move down one tick because the price level of 99 is now the second price level having quantity; not the price level of 100.

FIG. 6B illustrates a price level transition that will not trigger distribution of market data. As shown at the price level 630 of 98, the quantity available in FIG. 6A shifted to no quantity available in FIG. 6B. This shift from "quantity available" to "no quantity available" is typically considered a price level transition that would trigger distribution of market data. However, because the shift occurred at a price level that is more than two levels away from the inside market, the price level transition is not considered a price level transition for purposes of distribution. Over time, the market may move and this price level 630 may eventually be within the defined trigger levels.

FIG. 6C illustrates a price level transition that triggers distribution of market data. As shown at the price level 640 of 100, the "quantity available" in FIG. 6B shifted to "no quantity available" in FIG. 6C. This shift from "quantity available" to "no quantity available" is triggers distribution of market data because it occurred at a price level that is within two levels from the inside market. Over time, the market may move and this price level 640 may eventually no longer be within the defined trigger levels.

The price level transitions that trigger distribution of market data may be set by a user, a trading tool, or set as a default during manufacture, for example. For example, a trader may set which price levels trigger distribution of market data either prior to or during a trading session. In another example, an automated trading tool may set the price levels, for example, based on market activity, trader preferences, or other criteria. The automated trading tool may continuously adjust (e.g., widen/narrow the window shown in FIG. 6 or select individual price levels) which price levels trigger distribution of market data in an attempt to distribute the optimal amount of market data.

FIGS. 11A and 11B illustrate another example of a price level transition. In some embodiments, a trading strategy may depend on the aggregate quantity of one, some, or all of the price levels. For example, a trading strategy may require that there be sufficient quantity available at one, some, or all of the price levels to allow a trade to be filled. As shown in FIG. 11A, a trading strategy may be designed to sell 30 units of the tradeable object being bought/sold using the value axis. The trading strategy may depend on there being enough depth to sell (assuming that price does not matter). In FIG. 11A, the aggregate bid quantity available 1110 is 31 bids. This is enough quantity to match the order to sell 30 units. However, as shown in FIG. 11B, the aggregate bid quantity available 1120 has dropped to 18 bids. This is not enough quantity. The aggregate quantity threshold may be an absolute or relative threshold. An absolute threshold may be set as a default or by the user before or during a trading session. A relative threshold may change, for example, as other orders change (e.g., if the trading strategy is leaning on a different tradeable object). In some embodiment, a certain number of price levels may be combined with the aggregate quantity threshold.

FIGS. 12A and 12B illustrate another example of a price level transition. In some embodiments, a price level transition may include a change in the high or low price level for a trading session. A trading session may include a session for which a tradeable object is available for trading (e.g., the business day). The trading session may have an opening time and closing time each day, for example.

In FIG. 12A, the high price level 1210 (e.g., the highest price that was paid to purchase the tradeable object) for the trading session is currently at a price level of 103. However, as shown in FIG. 12B, the previous orders (e.g., quantity of 12) to sell the tradeable object at a price of 104 were matched against a contra-side order to buy at a price level 1220 of 104. As a result, the new high price level for the trading session is 104. It changed from 103 to 104. This change is an exemplary price level transition.

Returning to act 220 of the method 200 of FIG. 2, in the event that a price level transition is detected (e.g., "YES" in FIG. 2), the computing device may distribute market data, as shown in act 230. However, if a price level transition is not detected (e.g., "NO" in act 220 of FIG. 2), the method 200 returns to act 210 and again receives market data. Market data may be received to capture any updated market data. This may be repeated until a price level transition is detected.

In act 230, the computing device distributes market data. Distributing market data may include generating, sending, transmitting, displaying, or otherwise communicating market data. Distribution may be different for different components. For example, upon detection of a price level transition, an exchange—such as the exchange 130 of FIG. 1—may release a price feed or message that includes the market data. In another example, a gateway may receive a price feed from an exchange and upon detection of a price level transition forward the price feed to a trading device. In yet another example, a trading device may receive a price feed and upon detection of a price level transition display the market data, for example, along a price axis.

Figure 7:
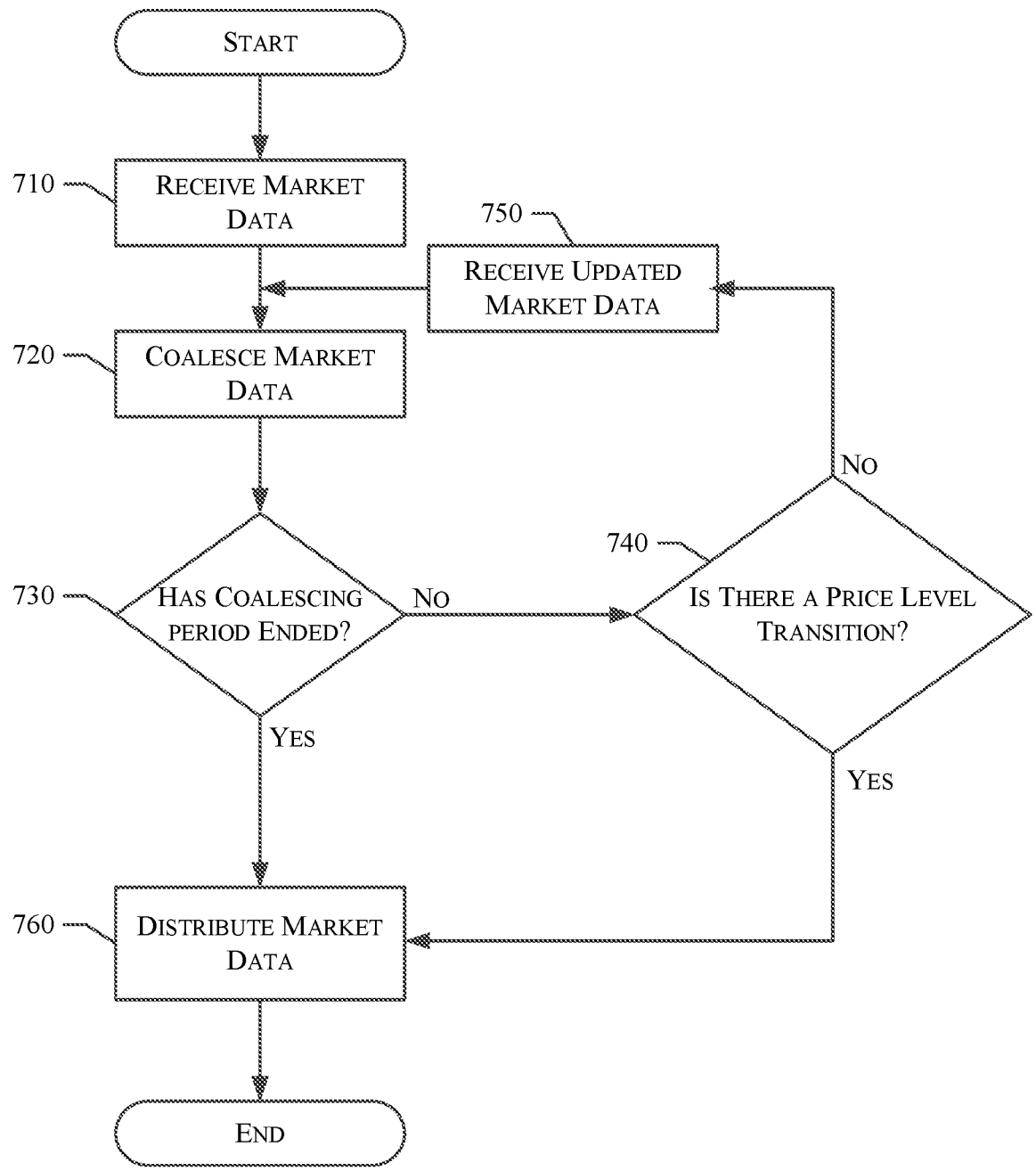
FIG. 7 illustrates another block diagram of a method for distributing market data based on a price level transition.

FIG. 7 illustrates a block diagram of a method 700 for distributing market data based on one or more price level transitions. The method 700 may be implemented by any of an apparatus (e.g., the trading device 110, gateway 120, or electronic exchange 130 of FIG. 1), a system, a computer program, a computer readable medium, or a combination thereof.

With respect to method 700, changes and modifications, such as additional, different, or fewer acts, may be made to the process shown in FIG. 7 without departing from the spirit and scope of certain inventive aspects described herein. For example, the method 700 may include only acts 720, 730, and 760 or a different combination of acts. Furthermore, the acts shown in FIG. 7 may be performed in the order shown or a different order. The acts shown in FIG. 7 may be the same or similar to the acts shown in FIG. 2.

In act 710, a computing device receives market data.

In act 720, the computing device may begin or continue coalescing market data. Coalescing market data may include aggregating market data. For example, market data may be coalesced so the most up-to-date market data is transmitted at the end of a coalescing period. The "stale" (e.g., not the most current) market data may be discarded or not used or eventually not distributed.

In act 730, the computing device may determine whether a coalescing period has ended. A coalescing period (e.g., the period of time that a computing device coalesces market data) may be defined (e.g., 5 seconds) or dynamic (e.g., until a message requesting the coalesced data is received). Determining whether a coalescing period has ended may include using a coalescing timer to measure a period of time for the coalescing period. A coalescing timer may be particularly useful when the coalescing period is defined. By way of example, the coalescing period may have a defined period of time of one (1) second. If the coalescing timer is less than one second, then the coalescing period has not ended. However, if the coalescing timer is equal to or greater than one second, then the coalescing period has ended. As another example, the coalescing period may end when a message requesting the coalesced data is received.

In act 740, when the coalescing period has not ended ("NO" in act 730 of FIG. 7), the computing device determines whether there is a price level transition. If a price level transition has not occurred ("NO" in act 740 of FIG. 7), then the computing device may receive updated market data in act 750. There may not be any updated market data since the market data was previously received (e.g., either in act 710 or act 750). Either way, the computing device continues coalescing the market data until the coalescing period has ended in act 730 ("YES" in act 730 of FIG. 7).

In act 760, the computing device distributes market data when the coalescing period has ended ("YES" in act 730 of FIG. 7) or a price level transition is detected ("YES" in act 740 of FIG. 7).

Figure 8:
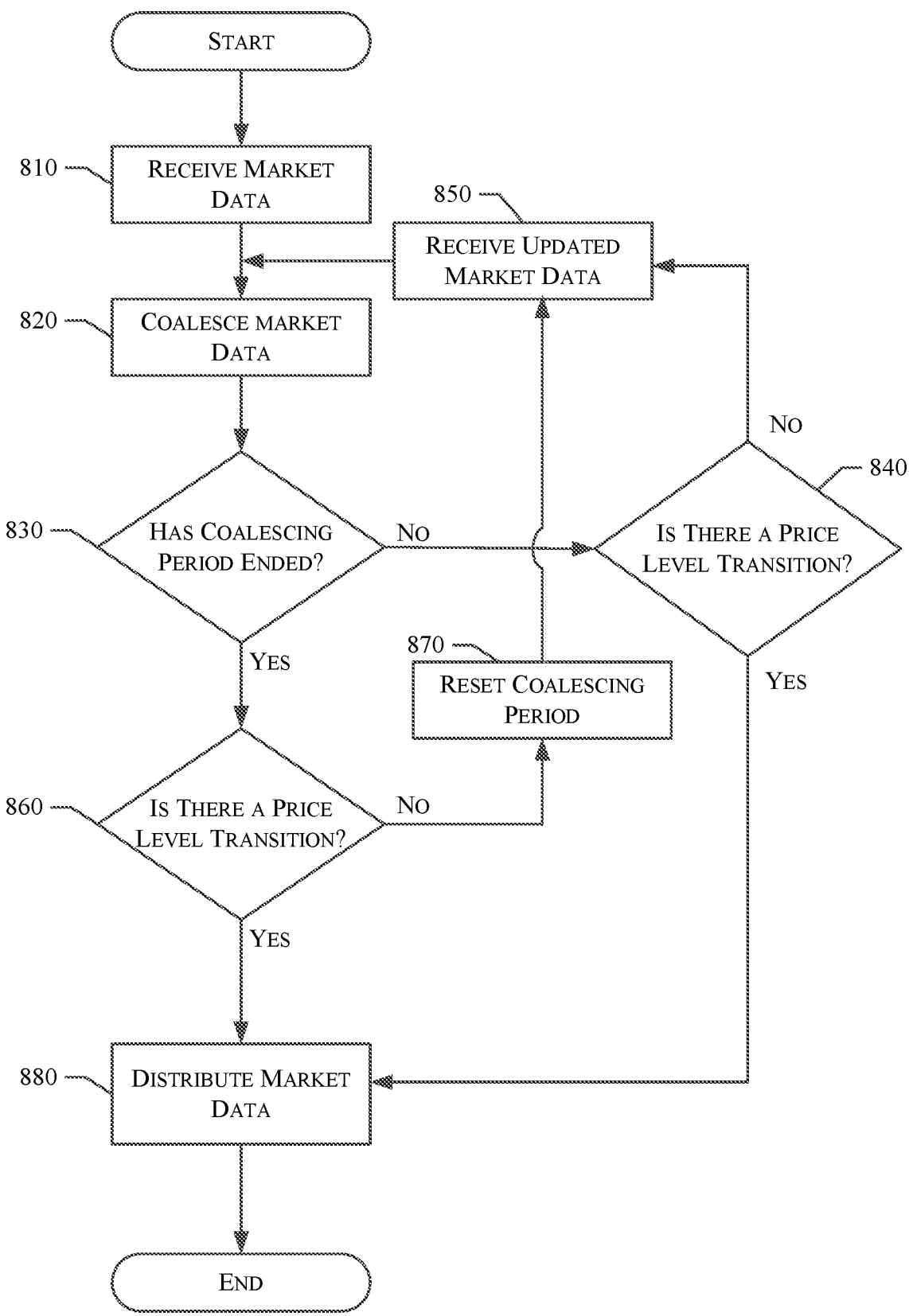
FIG. 8 illustrates yet another block diagram of a method for distributing market data based on a price level transition.

FIG. 8 illustrates a block diagram of a method 800 for distributing market data based on one or more price level transitions. The method 800 may be implemented by any of an apparatus (e.g., the trading device 110, gateway 120, or electronic exchange 130 of FIG. 1), a system, a computer program, a computer readable medium, or a combination thereof.

With respect to method 800, changes and modifications, such as additional, different, or fewer acts, may be made to the process shown in FIG. 8 without departing from the spirit and scope of certain inventive aspects described herein. For example, the method 800 may include only acts 820, 830, and 860 or a different combination of acts. Furthermore, the acts shown in FIG. 7 may be performed in the order shown or a different order.

Certain acts shown in FIG. 8 may be the same or similar to the acts shown in FIG. 2 and/or FIG. 7. For example, act 810 may be the same or similar to act 210 of FIG. 2 or act 710 of FIG. 7. As another example, acts 820 and/or 830 may be the same or similar to acts 720 or 730 of FIG. 7. Other acts may be the same or similar.

In act 810, a computing device receives market data.

In act 820, the computing device coalesces market data.

In act 830, the computing device determines whether a coalescing period has ended. If the coalescing period has not ended ("NO" in act 830 of FIG. 8), the computing device determines whether a price level transition has occurred in act 840. If a price level transition is not detected ("NO" in act 840 of FIG. 8), then the computing device receives any available updated market data in act 850 and continues coalescing the market data.

In the event that the coalescing period has ended ("YES" in act 830 of FIG. 8), then the computing device may determine whether there has been a price level transition (e.g., with respect to the last time market data was distributed or during the latest coalescing period), as shown in act 860. If not ("NO" in act 860 of FIG. 8), then the coalescing period is reset in act 870 and the computing device may receive any available updated market data in act 850 and continue coalescing the market data. Resetting the coalescing period (act 870) may include resetting a timer or continuing to wait for a message requesting coalesced data, for example.

In the event that there was a price level transition—for example, either in act 840 or act 860—then the computing device may distribute market data as shown in act 880.

Figure 9:
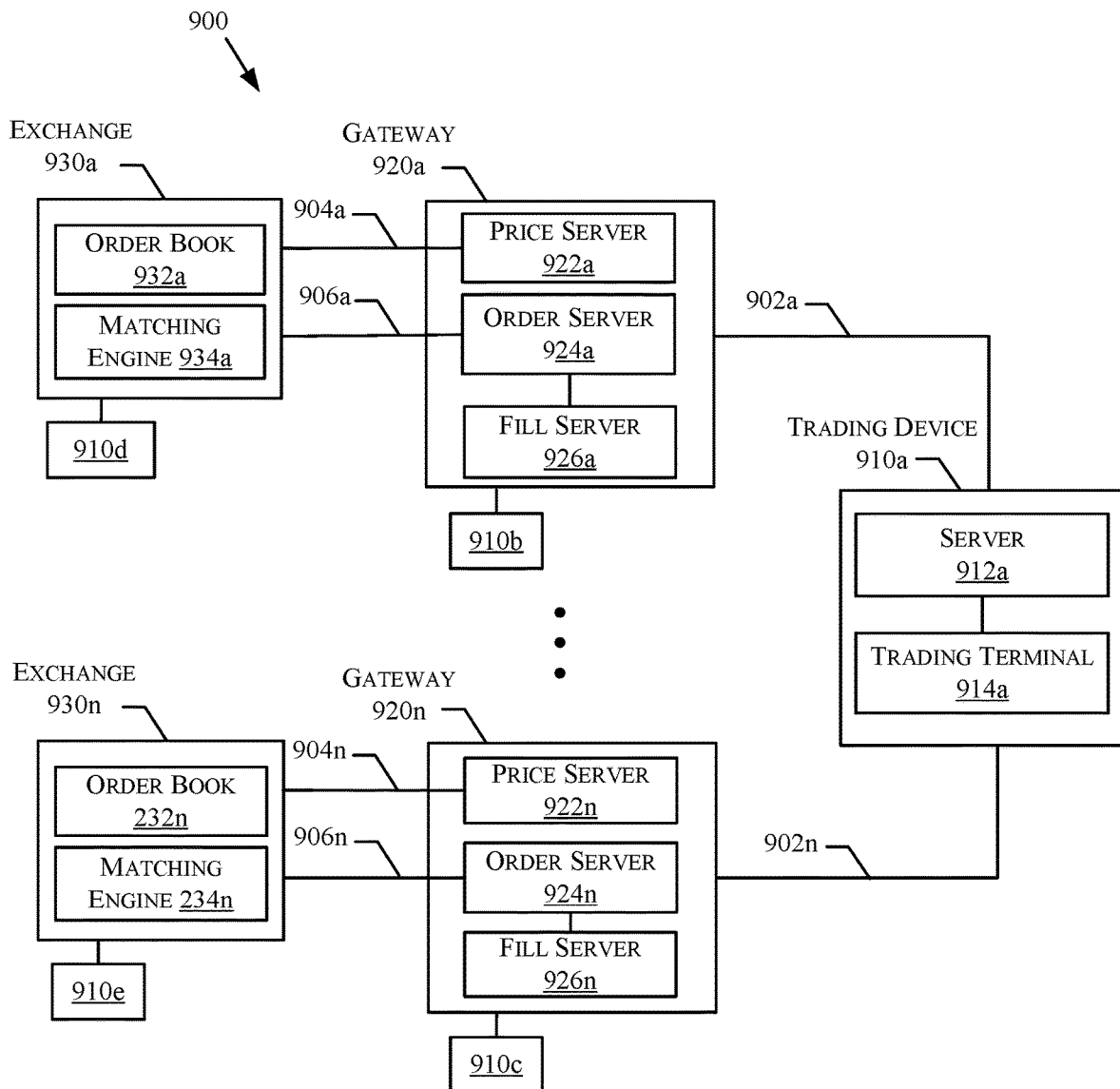
FIG. 9 illustrates another block diagram representative of an example electronic trading system in which certain embodiments may be employed.

FIG. 9 illustrates a block diagram of an exemplary electronic trading system 900 in which certain embodiments may be employed. In some embodiments, the electronic trading system 900 is an expansion of one or more embodiments of the electronic trading system 100 of FIG. 1. As a result, one or more components in system 900 may be the same or similar as one or more components in system 100.

FIG. 9 highlights at least a few of the benefits of distributing market data based on price level transitions. Typically, price updates from a server to a trading terminal are dominated by the volume of updates and churn (e.g., spin or rapidly update) of the quantities available at a given price level. An example of this updating or churning is the quantity available at a particular price level may change from 24 to 32 to 48 to 12 to 84 to 75 in less than a second. It's often the case that the quantities offered at a given price level change more often than do the notions of "what level" the market is at (or what levels in depth there are quantities). For example, with a 9 bid at 10 market, the quantity bid at 9 might change many times before the best bid price level moves up or down. When humans look at the updating or churning of quantity at a given depth level (such as in a best bid location) they cannot perceive the intermediate quantities as they are changing too quickly. However, humans (e.g., traders watching a display device) can easily detect a price level move, such as the best bid suddenly moving from 9 to 10, as the transition from nothing to something is noticeable on screen. Accordingly, in many cases, only updating the market data on a trading terminal when there is a price level transition may be sufficient and in many cases preferred.

Certain automated trading tools—such as ADL™, AUTOSPREADER®, and/or AUTOTRADER™ provided by Trading Technologies International, Inc. of Chicago, Illinois ("Trading Technologies")—may not base actions on changes in the quantity available at the various levels in the depth. For instance, an automated trading tool may not take any action based on a change in quantity of 24 at a price level to a quantity in 32 at the same price level. In operation, the automated trading tool may only care (e.g., take action) when there is a change at a price level, such as a change from "quantity available" to "no quantity available" or vice versa or a change in the last traded price, for example. In other words, the automated trading tool generally doesn't base actions on changes in quantity available at a price level at least in part because they change too quickly.

In the example of FIG. 9, a trading device 910*a* is in communication with an exchange 930*a* through a gateway 920*a*. The following discussion mainly focuses on the trading device 910*a*, gateway 920*a*, and the exchange 930*a*. However, the trading device 910*a* may also be connected to and communicate with any number of gateways 920*n* connected to any number of exchanges 930*n*. The communication between the trading device 110*a* and other exchanges 930*n* may be the same, similar, or different than the communication between the trading device 910*a* and exchange 930*a*. Generally, each exchange has its own preferred techniques and/or formats for communicating with a trading device, a gateway, the user, or another exchange.

The trading device 910*a* may be similar to the trading device 110 in FIG. 1. The trading device 910*a* may include one or more electronic computing platforms. For example, the trading device 910*a* may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 910*a* may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

In some embodiments, the trading device 910*a* may be implemented as a personal computer running a copy of X_TRADER®, an electronic trading platform provided by Trading Technologies. As another example, the trading device 910*a* may be a server running a trading application providing automated trading tools such as ADL™, AUTOSPREADER®, and/or AUTOTRADER™, also provided by Trading Technologies. In yet another example, the trading device 910*a* may include a trading terminal in communication with a server, where collectively the trading terminal and the server are the trading device 910*a*.

The trading device 910*a* is generally owned, operated, controlled, programmed, configured, or otherwise used by a user. As used herein, the phrase "user" may include, but is not limited to, a human (for example, a trader), trading group (for example, group of traders), or an electronic trading device (for example, an algorithmic trading system). One or more users may be involved in the ownership, operation, control, programming, configuration, or other use, for example.

The trading device 910*a* may include one or more trading applications. As used herein, a trading application is an application that facilitates or improves electronic trading. A trading application provides one or more electronic trading tools. For example, a trading application stored by a trading device may be executed to arrange and display market data in one or more trading windows or interfaces. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. An example of a trading tool may be a value axis. The trading tool may be included as part of a trading interface. The electronic trading tools provided by the trading application may always be available or may be available only in certain configurations or operating modes of the trading application.

A trading application may include computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 910a from another computer readable medium. For example, the trading application (or updates to the trading application) may be stored by a manufacturer, developer, or publisher on one or more CDs or DVDs, which are then loaded onto the trading device 910a or to a server from which the trading device 910a retrieves the trading application. As another example, the trading device 910a may receive the trading application (or updates to the trading application) from a server, for example, via the Internet or an internal network. The trading device 910a may receive the trading application or updates when requested by the trading device 910a (for example, "pull distribution") and/or unrequested by the trading device 910a (for example, "push distribution").

The trading device 910a may be adapted to send order messages. For example, the order messages may be sent to through the gateway 120 to the exchange 130. As another example, the trading device 910a may be adapted to send order messages to a simulated exchange in a simulation environment which does not effectuate real-world trades.

The order messages may be sent at the request of a user. For example, a trader may utilize the trading device 910a to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 910a to the exchange 930a through the gateway 920a. The trading device 910a may communicate with the gateway 920a using a local area network, a wide area network, a wireless network, a virtual private network, a T1 line, a T3 line, an integrated services digital network ("ISDN") line, a point-of-presence, the Internet, and/or a shared memory system, for example.

The trading device 910a may be adapted to send other messages. For example, the trading device 910a may send a message to the gateway 920a requesting coalesced market data. In response, the gateway 920a would respond with the coalesced market data.

As shown in FIG. 9, the trading device 910a may include a server 912a in communication with a trading terminal 914a. The server 912a may be located geographically closer to the gateway 120 than the trading terminal 914a. As a result, the server 912a may have latency benefits that are not afforded to the trading terminal 914a. In operation, the trading terminal 914a may provide a trading screen to a user and communicate commands to the server 912a for further processing. For example, a trading algorithm may be deployed to the server 912a for execution based on market data. The server 912a may execute the trading algorithm without further input from the user. In another example, the server 912a may include a trading application providing automated trading tools and communicate back to the trading terminal 914a. The trading device 910a may include, additional, different, or fewer components.

In some embodiments, the trading device 910a may include one or more trading applications that distribute market data based on one or more price level transitions. For example, the trading terminal 914a may include a trading application that only displays market data in response to detection of one or more price level transitions. This may reduce the amount of market data that is displayed on the trading terminal. As a result, the display may be less confusing or cluttered or busy as a result of less market data being displayed. In another example, the server 912a may only transmit market data to the trading terminal in response to identification of one or more price level transitions. This may reduce the amount of market data that is passed back and/or forth between the server 912a and trading terminal 914a.

The trading device 910a may communicate with the gateway 920a using one or more communication networks. As used herein, a communication network is any network, including the Internet, which facilitates or enables communication between, for example, the trading device 910a, the gateway 920a and the exchange 920a. For example, as shown in FIG. 9, the trading device 910a may communicate with the gateway 920a across a multicast communication network 902a. The data on the network 902a may be logically separated by subject (for example, prices, orders, or fills). As a result, the server 912a and trading terminal 914a can subscribe to and receive data (for example, data relating to prices, orders, or fills) depending on their individual needs.

The gateway 920a, which may be similar to the gateway 120 of FIG. 1, may include a price server 922a, order server 924a, and fill server 926a. The gateway 920a may include additional, different, or fewer components. The price server 922a may process price data. Price data includes data related to a market for one or more tradeable objects. The order server 924a may process order data. Order data is data related to a user's trade orders. For example, order data may include order messages, confirmation messages, or other types of messages. The fill server collects and provides fill data. Fill data includes data relating to one or more fills of trade orders. For example, the fill server 926a may provide a record of trade orders, which have been routed through the order server 924a, that have and have not been filled. The servers 922a, 924a, 926a may run on the same machine or separate machines.

The gateway 920a may communicate with the exchange 930a using one or more communication networks. For example, as shown in FIG. 9, there may be two communication networks connecting the gateway 920a and the exchange 930a. The network 904a may be used to communicate market data to the price server 922a. In some instances, the exchange 930a may include this data in a data feed that is published to subscribing devices. The network 906a may be used to communicate order data. The gateway 120 may include one or more electronic computing platforms. For example, the gateway 120 may implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 920a may facilitate communication. For example, the gateway 920a may perform protocol translation for data communicated between the trading device 910a and the exchange 930a. The gateway 920a may process an order message received from the trading device 910a into a data format understood by the exchange 930a, for example. Similarly, the gateway 920a may transform market data in an exchange-specific format received from the exchange 930a into a format understood by the trading device 910a, for example.

The gateway 920a may include a trading application, similar to the trading applications discussed above, that facilitates or improves electronic trading. For example, the gateway 920a may include a trading application that tracks orders from the trading device 910a and updates the status of the order based on fill confirmations received from the exchange 930a. As another example, the gateway 920a may include a trading application that coalesces market data from the exchange 930a and provides it to the trading device 910a. In yet another example, the gateway 920a may include a trading application that provides risk processing, calculates implieds, handles order processing, handles market data processing, or a combination thereof.

In some embodiments, the gateway 920a may include one or more trading applications that distribute market data based on one or more price level transitions. For example, the price server 924a may include a trading application that only transmits a price feed in response to detection of one or more price level transitions. This may reduce the amount of price updates that are sent to the trading device 910a. As a result, the amount of market data that is passed back and/or forth between the gateway 920a and the trading device 910a may be optimally reduced.

In certain embodiments, the gateway 920a communicates with the exchange 130 using a local area network, a wide area network, a virtual private network, a T1 line, a T3 line, an ISDN line, a point-of-presence, the Internet, and/or a shared memory system, for example.

The exchange 930a, which may be similar to the exchange 130 of FIG. 1, may include an order book 932a and a matching engine 934a. The exchange 930a may include additional, different, or fewer components. The order book 932a is a database that includes data relating to unmatched quantity of trade orders. For example, an order book may include data relating to a market for a tradeable object, such as the inside market, market depth at various price levels, the last traded price, and the last traded quantity. The matching engine 934a may match contra-side bids and offers. For example, the matching engine 934a may execute one or more matching algorithms that match contra-side bids and offers. A sell order is contra-side to a buy order with the same price. Similarly, a buy order is contra-side to a sell order with the same price.

In operation, the exchange 930a may provide price data from the order book 932a to the price server 922a and order data and/or fill data from the matching engine 934a to the order server 924a. Servers 922a, 924a, 926a may translate and communicate this data back to the trading device 910a. The trading device 910a, for example, using a trading application, may process this data. For example, the data may be displayed to a user. In another example, the data may be utilized in a trading algorithm to determine whether a trade order should be submitted to the exchange 930a. The trading device 910a may prepare and send an order message to the exchange 930a.

In some embodiments, the exchange 930a may include one or more trading applications that distribute market data based on one or more price level transitions. For example, the exchange 930a may include a trading application that only transmits price data (e.g., via a price feed) in response to detection of one or more price level transitions. This may reduce the amount of price data that is sent to the price server 922a.

The exchange 930a may be owned, operated, controlled, or used by an exchange entity. Example exchange entities include the CME Group, the London International Financial Futures and Options Exchange, the Intercontinental Exchange, and Eurex. The exchange 930a may include an electronic matching system, such as a computer, server, or other computing device, which is adapted to allow tradeable objects, for example, offered for trading by the exchange, to be bought and sold. The exchange 930a may include separate entities, some of which list and/or administer tradeable objects and others which receive and match orders, for example. The exchange 930a may include an electronic communication network ("ECN"), for example.

The exchange 930a may be an electronic exchange. The exchange 930a is adapted to receive order messages and match contra-side trade orders to buy and sell tradeable objects. Unmatched trade orders may be listed for trading by the exchange 930a. The trade orders may include trade orders received from the trading device 110 or other devices in communication with the exchange 930a, for example. For example, typically the exchange 930a will be in communication with a variety of other trading devices (which may be similar to trading device 110) which also provide trade orders to be matched.

The exchange 930a is adapted to provide market data. Market data may be provided in one or more messages or data packets or through a shared memory system. For example, the exchange 930a may publish a data feed to subscribing devices, such as the trading device 110 or gateway 120. The data feed may include market data.

In certain embodiments, the gateway 920a is part of the trading device 910a. For example, the components of the gateway 920a may be part of the same computing platform as the trading device 910a. As another example, the functionality of the gateway 920a may be performed by components of the trading device 910a. In certain embodiments, the gateway 920a is not present. Such an arrangement may occur when the trading device 910a does not need to utilize the gateway 920a to communicate with the exchange 930a, for example. For example, if the trading device 910a has been adapted to communicate directly with the exchange 930a.

Additional trading devices 910b-910e, which are similar to trading device 910a, may be connected to one or more of the gateways 920a-920n and exchanges 930a-930n. Furthermore, additional gateways, similar to the gateway 920a, may be in communication with multiple exchanges, similar to the exchange 930a. Each gateway may be in communication with one or more different exchanges, for example. Such an arrangement may, for example, allow one or more trading devices 910a to trade at more than one exchange (and/or provide redundant connections to multiple exchanges).

The electronic trading system of FIG. 1 and/or the electronic trading system of FIG. 9 may include additional, different, or fewer components. The system 100 and/or system 900 may include additional, different, or fewer components. For example, electronic trading system 100 and/or 900 may include multiple trading devices, gateways, and/or exchanges. In another example, the system 100 and/or 900 may include other communication devices, such as middleware, firewalls, hubs, switches, routers, servers, exchange-specific communication equipment, modems, security managers, and/or encryption/decryption devices.

Figure 10:
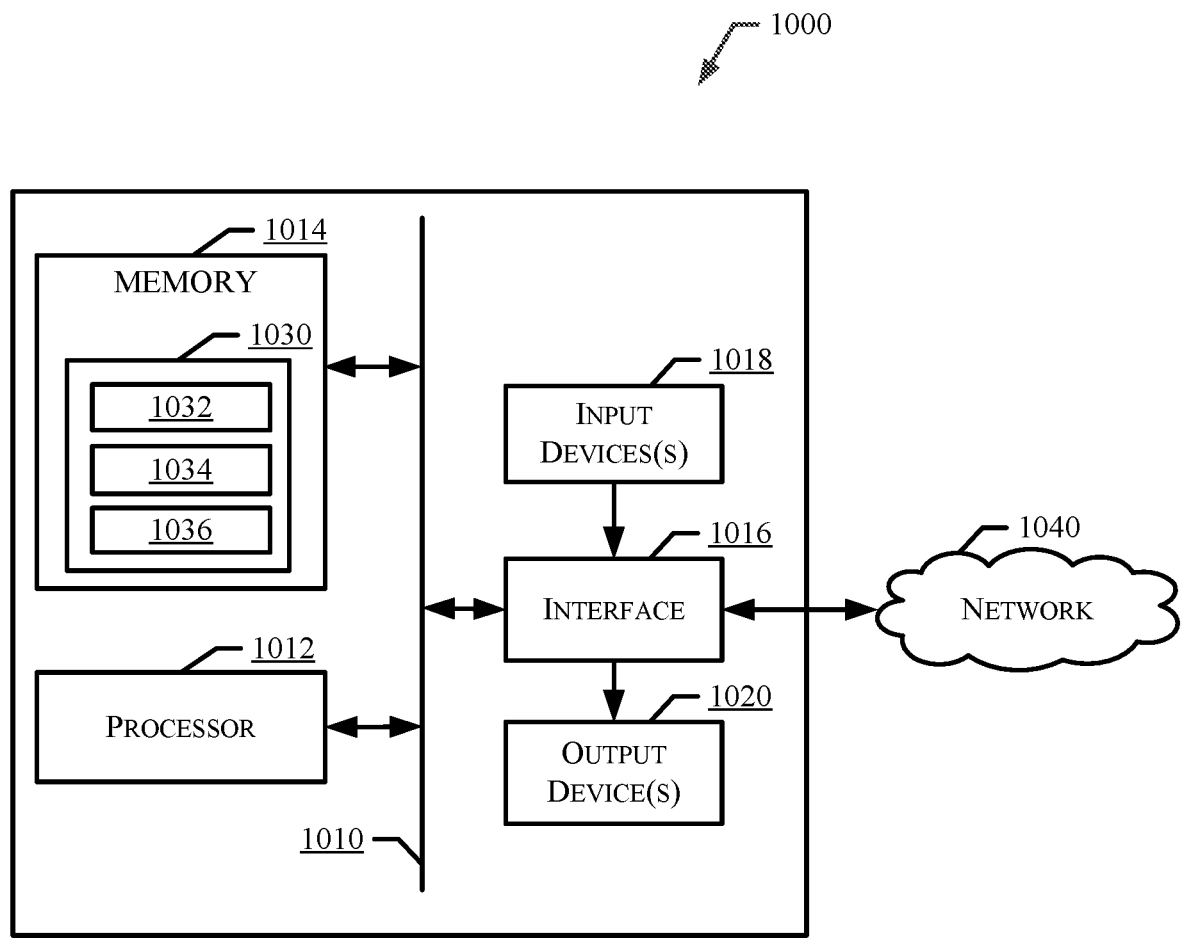
FIG. 10 illustrates an exemplary computing device that distributes market data based on one or more price level transitions.

FIG. 10 illustrates a block diagram of an example computing device 1000 which may be used to implement the disclosed embodiments. The trading device 110 of FIG. 1 or the trading device 910a of FIG. 9, for example, may include one or more computing devices 1000. The gateway 120 of FIG. 1 or the gateway 920a of FIG. 9 may include one or more computing devices 1000, for example. The exchange 130 of FIG. 1 or the exchange 930a of FIG. 9 may include one or more computing devices 1000, for example.

The computing device 1000 includes a communication network 1010, a processor 1012, a memory 1014, an interface 1016, an input device 1018, and an output device 1020. The computing device 1000 may include additional, different, or fewer components. For example, multiple communication networks, multiple processors, multiple memory, multiple interfaces, multiple input devices, multiple output devices, or any combination thereof, may be provided. As another example, the computing device 1000 may not include an input device 1018 or output device 1020.

As shown in FIG. 10, the computing device 1000 may include a processor 1012 coupled to a communication network 1010. The communication network 1010 may include a communication bus, channel, electrical or optical network, circuit, switch, fabric, or other mechanism for communicating data between components in the computing device 1000. The communication network 1010 may be communicatively coupled with and transfer data between any of the components of the computing device 1000. One or more of the other components may be coupled to the communication network 1010. For example, the processor 1012 may communicate with the memory 1014 and/or interface 1016 via the communication network 1010.

The processor 1012 may be any suitable processor, processing unit, or microprocessor. The processor 1012 may include one or more general processors, digital signal processors, application specific integrated circuits, field programmable gate arrays, analog circuits, digital circuits, programmed processors, and/or combinations thereof, for example. The processor 1012 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 1000 is a multi-processor system and, thus, may include one or more additional processors which are communicatively coupled to the communication network 1010.

The processor 1012 may be operable to execute logic and other computer readable instructions encoded in one or more tangible media, such as the memory 1014. As used herein, logic encoded in one or more tangible media includes instructions which may be executable by the processor 1012 or a different processor. The logic may be stored as part of software, hardware, integrated circuits, firmware, and/or micro-code, for example. The logic may be received from an external communication device via a communication network such as the network 1040. The processor 1012 may execute the logic to perform the functions, acts, or tasks illustrated in the figures or described herein.

The memory 1014 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 1014 may include any desired type of mass storage device including hard disk drives, optical media, magnetic tape or disk, etc.

The memory 1014 may include one or more memory devices. For example, the memory 1014 may include local memory, a mass storage device, volatile memory, non-volatile memory, or a combination thereof. The memory 1014 may be adjacent to, part of, programmed with, networked with, and/or remote from processor 1012, so the data stored in the memory 1014 may be retrieved and processed by the processor 1012, for example. The memory 1014 may store instructions which are executable by the processor 1012. The instructions may be executed to perform one or more of the acts or functions described herein or shown in the figures. For example, the instructions may be executed by a processor, such as the processor 1012, to implement a method, such as all or a portion of the method 200 shown in FIG. 2, all or a portion of the method 700 shown in FIG. 7, or all or a portion of the method 800 shown in FIG. 8.

The memory 1014 may store a trading application 1030. In certain embodiments, the trading application 1030 may be accessed from or stored in different locations. The processor 1012 may access the trading application 1030 stored in the memory 1014 and execute computer-readable instructions included in the trading application 1030. By way of example, the memory 1014 may include instructions for receiving market data 1032, instructions for identifying one or more price level transitions 1034, and instructions for distributing market data based on the one or more price level transitions.

In certain embodiments, during an installation process, the trading application may be transferred from the input device 1018 and/or the network 1040 to the memory 1014. When the computing device 1000 is running or preparing to run the trading application 1030, the processor 1012 may retrieve the instructions from the memory 1014 via the communication network 1010.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EE- PROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

The invention claimed is:

1. A system including:
   a computing device having a processor and a memory storing instructions executable by the processor, including instructions executing the steps of:
   receiving a plurality of market data update messages for a tradeable object from an electronic exchange, wherein each market data update message includes quantity available for the tradeable object at a plurality of price levels at a particular time, wherein the plurality of price levels includes a best bid price level and a best ask price level;
   coalescing during a coalescing period, market data update messages of the plurality of market data update messages as they are received from the electronic exchange to generate coalesced market data, wherein the coalescing period represents a time interval during which coalescing will occur without sending updated market data to a trading device until the end of the time interval, wherein the coalescing period begins at a coalescing period start time and ends at a coalescing period end time;
   identifying in response to receiving each market update message during the coalescing period, whether a price level transition has occurred, wherein a price level transition is identified when at least one of the best bid price level and the best ask price level in a currently received market update message has changed from a previously received market update message;
   sending before the coalescing period end time, the coalesced market data to the trading device in response to identifying the price level transition has occurred; and
   sending the coalesced market data to the trading device at the coalescing period end time when the price level transition is not identified to have occurred.

2. The system of claim 1, wherein the price level transition is further identified when quantity available at a price level of the plurality of price levels in the previously received market update message has changed to no quantity available at the price level in the currently received market update message.

3. The system of claim 1, wherein the price level transition is further identified when no quantity available at a price level of the plurality of price levels in the previously received market update message has changed to quantity available at the price level in the currently received market update message.

4. The system of claim 1, wherein the price level transition is further identified when an overall quantity available at the plurality of price levels in the currently received market update message exceeds a threshold.

5. The system of claim 1, wherein the price level transition is further identified when at least one of the low price level and the high price level for a trading session for the tradeable object has changed in the currently received market update message.

6. The system of claim 1, wherein the price level transition is further identified when quantity available at a price level of the plurality of price levels in the currently received market update message has changed from quantity available at the price level in the previously received market update message by an amount that exceeds a threshold.

7. The system of claim 1, wherein the coalescing period end time occurs at an expiration of a defined period of time.

8. The system of claim 1, wherein the coalescing period end time occurs when a message requesting market data is received from the trading device.

9. The system of claim 1, wherein the computing device is a gateway.

10. The system of claim 1, wherein the computing device is the electronic exchange.

* * * * *